Patented Sept. 22, 1953

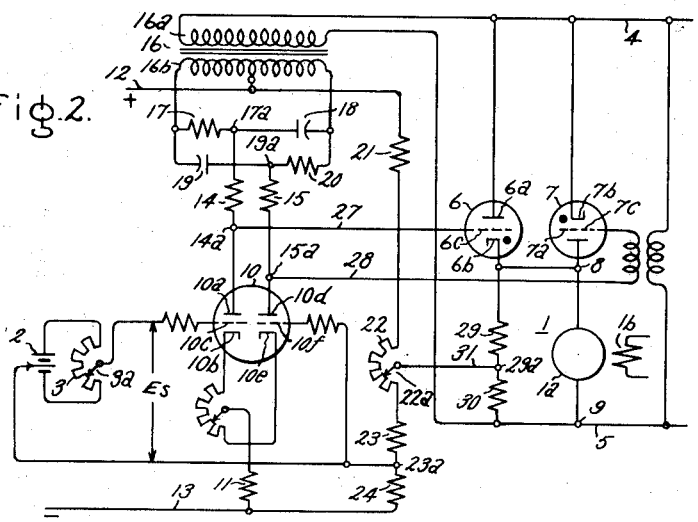

2,653,289

UNITED STATES PATENT OFFICE 2,653,289

THYRATRON REVERSING MOTOR CONTROL SYSTEM

Leroy U. C. Kelling, Schenectady, N. Y., assignor to General Electric Company, a corporation of New York Application July 11, 1951, Serial No. 236,156

9 Claims. (Cl. 318—257)

This invention relates to systems for controlling the operation of an electric motor, more particularly to motor control systems in which electric valve apparatus is provided for controlling the speed and direction of rotation of the motor in response to a direct signal voltage and it has for an object the provision of a simple, reliable, and improved control system of this character.

A further object of the invention is the provision of a low cost electronic reversing motor control system with a speed voltage feed-back.

A still further object of the invention is the provision of an electronic motor control system in which operation in either direction is obtained by means of two thyratrons connected in reverse parallel in the armature circuit and in which the speed of the motor is controlled by the combined effect of a variable magnitude control voltage and a voltage derived from the counter voltage of the motor and proportional thereto fed back into the control electrode circuit of the thyratrons to produce a motor speed which closely matches the control voltage.

In carrying the invention into effect in one form thereto, a pair of electric power valves, such as thyratrons, are provided for controlling the supply of voltage to the motor. These valves are reversely connected in parallel between one armature terminal and one terminal of the source of alternating voltage, of which the other terminal is directly connected to the other motor terminal. Means are provided for selectively supplying control voltages having direct and alternating components to the control electrode circuits of the power valves, thereby to energize the valves selectively and to effect rotation of the motor in a selected direction and at a speed corresponding to the magnitude of a signal voltage. The speed is maintained in predetermined relationship to the signal voltage by feeding back to the control electrode circuit a voltage derived from the counter voltage of the motor and having a polarity opposite to that of the direct component of the control voltage. The cathode of one of the power valves is directly connected to the armature circuit, whereas the cathode of the reversely connected valve is separated from the armature by the voltage of the source. Consequently, the source voltage is present in the feed back connections to the control electrode of the reversely connected valve. The effect of the voltage of the source is eliminated by supplying in the feedback circuit a voltage equal in magnitude and opposite in phase to the voltage of the source. For the purpose of deriving a feedback voltage from the counter voltage, a voltage divider is connected across a portion of the armature circuit and a connection is made from an intermediate point on the voltage divider to a point on the control voltage source.

For a better and more complete understanding of the invention, reference should now be had to the following specification and to the accompanying drawing of which Fig. 1 is a simple, diagrammatical illustration of an embodiment of the invention; Fig. 2 is a simple, diagrammatical illustration of a modification and Fig. 3 is a chart of characteristic curves which serves to facilitate an understanding of the operation.

Referring now to the drawing, the speed and direction of rotation of a direct current motor 1 are to be controlled in response to changes in a signal voltage $E_s$ which is supplied from a suitable source of signal voltage such as that represented by the battery 2 and the potentiometer 3 which is connected across its terminals. In the embodiment illustrated in Fig. 1, the motor is to be controlled so that its speed is determined by the magnitude of the signal voltage and its direction of rotation corresponds to the direction of displacement of the slider $3a$ of the potentiometer from a predetermined zero speed position, which for the purpose of illustration may be assumed to be the mid-point.

Current is supplied in either direction to the armature $1a$ of the motor from a suitable source such as represented by the two alternating voltage supply conductors 4 and 5 through one or the other of the two electric valves 6 and 7. As shown, these valves are reversely connected in parallel, i. e. the anode $6a$ of valve 6 is directly connected to the cathode $7b$ of valve 7 and the anode $7a$ of valve 7 is directly connected to the cathode $6b$ of valve 6. Although the valves 6 and 7 may be of any suitable type, they are preferably thyratrons. The cathode $6b$ and the anode $7a$ are directly connected to the motor armature terminal 8 and the anode $6a$ and cathode $7b$ are connected to the supply conductor 4. The opposite supply conductor 5 is directly connected to the armature terminal 9. Consequently, the voltage of the supply source is added in series between the cathode $7b$ and the armature. When the thyratron 6 is conducting, the motor rotates in one direction, e. g. the forward direction and when the thyratron 7 is conducting, the motor rotates in the reverse direction.

The field winding $1b$ of the motor is supplied from a suitable source of direct voltage which is not illustrated in the drawing.

For the purpose of controlling the selective conduction of the thyratrons 6 and 7, an electric valve amplifier is provided. It is illustrated as comprising a cathode-coupled twin-triode electric valve 10. Although this valve may be of any suitable type, it is preferably a 6SL7GT high vacuum type valve. The left hand portion of the valve 10 comprises an anode 10a, a cathode 10b and a control electrode 10c and the right hand portion comprises an anode 10d, a cathode 10e and a control electrode 10f. The right and left hand portions of the valve constitute two matched valves in a single envelope having their cathodes coupled and connected through a cathode resistor 11 of rather high value to one side of a source of direct voltage such as that represented by the conductors 12 and 13. Separate resistors 14 and 15 are connected in circuit with the anodes 10a and 10d, respectively. These anode resistors are approximately equal. Between these resistors and the supply conductor 12 is connected a bias alternating voltage network. It comprises the secondary winding 16b of a transformer 16 and two parallel resistance reactance branches connected across its terminals. The primary winding 16a is supplied from the supply conductors 4 and 5 and the mid-tap of the secondary winding 16b is connected to the direct voltage supply conductor 12. One of the resistance reactance branches comprises a resistor 17 and a capacitor 18 connected in series relationship and the second branch comprises the capacitor 19 and the resistor 20 connected in series relationship. The values of the resistors 17 and 20 and the capacitors 18 and 19 are choosen so that the voltages of the common point 17a lags the line voltage 90 degrees and the voltage of the common point 19a leads the line voltage 90 degrees. Thus, the voltages at the anodes 10a and 10d contain an alternating component bias.

A voltage divider comprising fixed resistor 21, a potentiometer 22, and fixed resistors 23 and 24, connected in series relationship with each other, is connected across the direct voltage suply conductors 12 and 13. The mid-point of the battery 2 and the control electrode 10f of the right hand conducting path of valve 10 are connected to an intermediate point on the voltage divider such, for example, as the common point 23a between resistors 23 and 24.

It may be assumed that the voltage of point 23a is such that with the slider 3a in mid-position both paths of the valve are conducting in approximately mid-range and the currents in the two paths are equal.

As long as the two control electrodes are maintained at the same voltage, changes in cathode heating and anode voltage balance and the current in both paths change equally, producing an equal change in the anode voltages and thereby maintaining circuit balance. However, when the voltage of one control electrode changes slightly with respect to the voltage of the other, the current in that path, as well as the IR drop in the common cathode resistor 11 is changed producing an opposite change in the current in the other path. For example, assume that the slider 3a is moved in a counterclockwise direction from its previously assumed mid-position so that the voltage of control electrode 10c is made more negative. The current in the left hand path will decrease causing the voltage across cathode resistor to decrease. This makes the voltage of the cathodes more negative so that the current in the right hand path is increased by an amount approximately, but not exactly, equal to the decrease in the current in the left hand path.

The anode terminals 14a and 15a constitute the output terminals of the amplifier. With equal currents in both paths of the amplifier, the voltage drops across the resistors 14 and 15 are equal. An increase in current in the left hand path increases the voltage drop across resistor 14, thereby making the voltage of the terminal 14a more negative. The corresponding decrease in current in the right hand path decreases the voltage drop across the resistor 15, thereby making the voltage of terminal 15a more positive. Conversely, a decrease in current in the left hand path decreases the voltage drop across resistor 14 and makes the voltage of the terminal 14a more positive, and the corresponding increase in current in the right hand path increases the voltage drop across the resistor 15, thereby making the voltage of the terminal 15a more negative. The potentiometer 11a provides circuit balance and is adjusted to equalize the potentials of output terminals 14a and 15a when the voltages of the control electrodes 10c and 10f are equal and the signal voltage supplied to the control electrodes is zero.

The operation of the amplifier is illustrated graphically in the chart of characteristic curves in Fig. 3 in which abscissae at the right of the vertical zero axis represent positive values of the signal voltage Es applied to control electrode 10c; abscissae at the left of the zero axis represent negative values of the signal voltage and ordinates above the horizontal zero axis represent voltage at the anodes 10a and 10d.

The curve 25 represents the relationship between the signal voltage and the voltage of anode 10a and the curve 26 represents the relationship between the signal voltage and the voltage at anode 10d. It will be noted that these curves have reverse slopes which indicates that as the voltage at one anode terminal becomes more positive the voltage at the other anode terminal becomes more negative. The intersection point of the two curves represents the balanced condition of the amplifier i. e. the condition in which the currents flowing in both paths are approximately equal and the voltages at the anode terminals are equal.

As shown, the anode terminal 14a is connected by means of conductor 27 to the control electrode 6c of thyratron 6 and the anode terminal 15a is connected by means of conductor 28 to the control electrode 7c of the reversely connected thyratron 7. Across a portion of the armature circuit of the motor is connected a voltage divider illustrated as comprising two serially connected resistors 29 and 30. In Fig. 1, this voltage divider is illustrated as being connected in parallel with thyratrons 6 and 7. A conductor 31 connects the intermediate point 29a of the voltage divider to the slider 22a of the potentiometer 22.

For the purpose of deriving a voltage from the counter voltage of the motor and supplying it as a negative feedback voltage between the cathodes and control electrodes of the thyratrons, the intermediate point 29a on the voltage divider is connected through rectifiers 32 and 33 and conductors 34 and 35 respectively, to the armature terminal 8 and 9. Although the rectifiers 32 and 33 may be of any suitable type, they are preferably of the selenium or copper oxide disk type. Included serially in the connection between the intermediate point 29a and the armature terminal 8 is the secondary winding 36b of a transformer of which the primary winding is connected across the alternating voltage supply conductors 4 and 5. This transformer has a turn ratio of 1:1. It is poled so that in the cathode to control electrode circuit, its secondary voltage is equal in magnitude and opposite in phase to the voltage of the source.

During the positive half cycle of the alternating voltage i. e. the half cycle in which the voltage of the conductor 4 is positive, current flows from conductor 4 through resistor 29 and rectifier 32 to the supply conductor 5. Since the voltage drop across the rectifier is small, the slider 22a is, for all practical purposes, electrically tied directly to the armature terminal 9. The cathode to control electrode circuit of the thyratron 6, extends from the cathode 6b through the armature 1a and rectifier 32 to slider 22a of the potentiometer and is completed from the anode terminal 14a to the control electrode 6c. Between the slider 22a and the anode terminal 14a, a voltage exists, the magnitude of which is dependent on the position of the slider and the magnitude of the current flowing in the left hand conducting path of valve 10. As this voltage is represented by the symbol $Ea$ and the counter voltage of the motor is represented by the symbol $Ec$ the total voltage $Eg6$ in the cathode to control electrode circuit is defined by the equation (1) $$Eg6 = -Ec + Ea$$

The minus sign of the counter voltage $Ec$ indicates a negative feed-back of the counter voltage and the equation illustrates that the net cathode to control electrode voltage is the difference of the control voltage from slider 22a to anode terminal 14a and the counter voltage.

Similarly, the cathode to control electrode circuit of the thyratron 7 extends from the cathode 7b through the source to armature terminal 9, through the armature 1a, secondary winding 36b and rectifier 33 to slider 22a, and is completed from anode terminal 15a to the control electrode 7c. As previously pointed out, the voltage of the secondary winding 36b is equal in magnitude and is opposite in phase to the voltage of the source. If the voltage of the source is represented by $El$ then the voltage of the secondary is minus $El$. From the foregoing, it is clear that the cathode to control electrode voltage $Eg7$ of the thyratron 7 is defined by the equation (2) $$Eg7 = El - Ec - El + Ea$$

or $$Eg7 = -Ec + Ea$$

Thus the unwanted voltage of the source in the cathode to control electrode circuit of thyratron 7 is cancelled by the voltage of the secondary winding. It will be noted that the position of the slider 22a actually controls the magnitude of the direct voltage bias on the control electrodes of the thyratrons. Turning the slider in a counter-clockwise direction decreases the negative bias.

In operation, the slider 22a is adjusted until with both paths of the cathode coupled amplifier balanced, i. e. conducting equally, the thyratrons are biased in the region of cut-off. Actually, they may be conducting negligibly small currents in opposite half cycles so that a negligible alternating current flows in the armature circuit and the motor is at standstill.

Movement of the slider 3a of the signal voltage potentiometer in a clockwise direction from the central zero speed position causes the voltage of the anode terminal 14a to become more negative and that of anode terminal 15a to become more positive in accordance with the characteristic illustrated in Fig. 3.

At standstill, the motor generates no counter voltage. Consequently, in the first half cycle of the alternating voltage, which is positive at the anode 6a, the control electrode voltage which determines the firing point of the thyratron 6, is the control voltage $Ea$ between the slider 22a and anode terminal 14a, plus the superimposed alternating voltage bias supplied from the phase splitting branch circuit 17 and 18. As this combination of voltages results in positive voltage on the control electrode at the beginning of the first half cycle, the thyratron 6 will fire at the beginning of the half cycle and conduction will continue until the reversal of the anode voltage at the end of the half cycle. Consequently, a current will flow in the armature circuit and the motor will accelerate and generate a counter voltage which is positive at terminal 8.

At the beginning of the next half cycle this counter voltage makes the voltage of cathode 6b more positive which represents a voltage in the turn-off direction. Thus in each of the succeeding positive half cycles, the thyratron fires at a point determined by the instantaneous combination of control voltage $Ea$, the A.-C. bias voltage and the counter voltage, and the motor accelerates until a balanced condition of the system is attained. From the foregoing it is seen that the combination of the A.-C. bias voltage, the signal voltage and the counter voltage varies the firing point of the thyratron in the positive half cycles of anode voltage. If the signal voltage is substantially larger than the counter voltage the thyratron fires at the beginning of the positive half cycle of anode voltage. If the counter voltage is substantially larger than the signal voltage the thyratron does not fire at any point in the positive half cycle. For intermediate values of difference between the signal voltage and counter voltage the thyratron is fired at corresponding intermediate phase positions in the positive half cycles. As long as the signal voltage $Es$ remains constant the motor runs steadily at this speed. Any change in the signal voltage will cause the motor to attain a new operating speed.

If the slider 3a of the signal voltage potentiometer is moved in the counter-clockwise direction from the central zero speed position, the thyratron 7 will conduct and cause the motor to accelerate in the reverse direction. The operation is similar to that described in the forward direction.

The modification of Fig. 2 is in most respects identical with the system of Fig. 1 and corresponding parts are designated by the same reference characters. It differs from the system of Fig. 1 in that the voltage divider comprising resistors 29 and 30 is connected across armature terminals 8 and 9 of the motor instead of across the thyratrons. With this connection, the rectifiers in the feed back circuit are unnecessary and are therefore omitted. The secondary winding 36b of the transformer is connected between the anode terminal 15a and the control electrode 7c. The two resistors 29 and 30 are substantially equal and since they are connected across the armature, only half the total counter voltage exists across either resistor. The equations which define the control electrode voltage are the same as those given for the modification of Fig. 1 with the exception that the term Ec is replaced by the term $$\frac{Ec}{2}$$

In all other respects, the modification of Fig. 2 is identical to the system in Fig. 1. The operation is so similar to the system of Fig. 1 that a description is omitted.

While the present invention has been described by reference to particular embodiments thereof, it is to be understood that numerous modifications may be made by those skilled in the art without departing from the essence of the invention and it is intended in the appended claims to cover all such equivalent variations as come within the true spirit and scope of the foregoing disclosure.

What I claim as new and desire to secure by Letters Patent of the United States is:

1. A motor control system comprising in combination, a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, a source of variable control voltage and connections from said source to said cathodes and control electrodes for supplying voltages between said cathodes and control electrodes for selectively increasing the conductivity of said valves to effect rotation of said motor in a selected direction, means for deriving a voltage from said armature terminals and supplying said derived voltage between said cathodes and control electrodes comprising a voltage divider connected in parallel with said valves and connections from an intermediate point on said divider to a point on said control voltage source and to said armature terminals, and means for supplying a voltage between the control electrode and cathode of said second valve equal in magnitude and opposite in phase to the voltage of said alternating voltage supply conductors.

2. A motor control system comprising in combination, a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, a source of variable control voltage and connections from said source to said cathodes and control electrodes for supplying voltages between said cathodes and control electrodes for selectively increasing the conductivity of said valves to effect rotation of said motor in a selected direction, means for deriving a voltage from said armature terminals and supplying said derived voltage between said cathodes and control electrodes comprising a voltage divider connected across a portion of the armature circuit of said motor, and connections from an intermediate point on said divider to a point on said control voltage source and to said armature terminals, and means for supplying between the cathode and control electrode of said second valve a voltage equal in magnitude and opposite in phase to the voltage of said alternating voltage supply conductors comprising a transformer having a primary winding supplied from said supply conductors and having a secondary winding connected in the cathode to control electrode circuit of said second valve.

3. A motor control system comprising in combination, a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, a source of variable control voltage and connections from said source to said cathodes and control electrodes for supplying voltages between said cathodes and control electrodes for selectively increasing the conductivity of said valves to effect rotation of said motor in a selected direction, means for deriving a voltage from said armature terminals and supplying said derived voltage between said cathodes and control electrodes comprising a voltage divider connected across a portion of the armature circuit of said motor, a connection from an intermediate point on said divider to a point on said control voltage source, a second connection from said intermediate point to said first armature terminal, a third connection from said intermediate point to said second armature terminal, and means for supplying between the cathode and control electrode of said second valve a voltage equal in magnitude and opposite in phase to the voltage of said alternating voltage supply conductors comprising a transformer having a primary winding supplied from said supply conductors and a secondary winding included in said third connection.

4. A motor control system comprising in combination, a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, a source of variable control voltage and connections from said source to said cathodes and control electrodes for supplying voltages between said cathodes and control electrodes for selectively advancing the firing point of said valves thereby selectively to increase the conductivity of said valves to effect rotation of said motor in a selected direction, means for deriving a voltage from said armature terminals and supplying said derived voltage between said cathodes and control electrodes to retard the firing point of said valves comprising a voltage divider connected across a portion of the armature circuit of said motor, a connection from an intermediate point on said divider to a point on said control voltage source, second and third connections from said intermediate point to said first and second armature terminals respectively and a separate rectifier included in each of said second and third connections, said rectifiers being similarly poled with respect to said intermediate point and means for supplying between the cathode and control electrode of said second valve a voltage equal in magnitude and opposite in phase to the voltage of said alternating voltage supply conductors comprising a transformer having a primary winding supplied from said supply conductors and a secondary winding included in cathode to control electrode circuit of said second valve.

5. A motor control system comprising in combination a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, means for supplying oppositely varying control voltages between the cathodes and control electrodes of said valves for selectively increasing the conductivity of said valves to effect rotation of said motor in a selected direction comprising a pair of direct voltage supply conductors, a cathode coupled pair of amplifier valves each having an anode, a cathode and a control electrode, a common resistor of substantial ohmic value connected between said coupled cathodes and one of said direct voltage supply conductors and separate resistors of substantial ohmic value connected between the anodes of said amplifier valves and the other direct voltage supply conductor, means for supplying a variable signal voltage to the control electrode of one of said amplifier valves, separate electrical connections from the anodes of said amplifier valves to the control electrodes of said first and second valves, a first voltage divider connected across said direct voltage supply conductors, means for deriving a voltage from said armature terminals and supplying said derived voltage between said cathodes and control electrodes of said first and second valves comprising a second voltage divider connected in parallel with a portion of the armature circuit of said motor, connections from an intermediate point on said second divider to an intermediate point on said first divider and to said armature terminals, and means for supplying a voltage between the control electrode and cathode of said second valve equal in magnitude and opposite in phase to the voltage of said alternating voltage supply conductors.

6. A motor control system comprising in combination a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, means for supplying oppositely varying control voltages between the cathodes and control electrodes of said valves for selectively increasing the conductivity of said valves to effect rotation of said motor in a selected direction comprising a pair of direct voltage supply conductors, a cathode coupled pair of amplifier valves each having an anode, a cathode and a control electrode, a common resistor of substantial ohmic value connected between said coupled cathodes and one of said direct voltage supply conductors and separate resistors of substantial ohmic value connected between the anodes of said amplifier valves and the other direct voltage supply conductor, means for supplying a variable signal voltage to the control electrode of one of said amplifier valves, a separate electrical connection from the anode of each of said amplifier valves to the control electrode of a corresponding one of said first and second electric valves, a first voltage divider comprising a plurality of resistors connected in series relationship across said direct voltage supply conductors, one of said resistors being provided with a sliding contact, means for deriving a voltage from said armature terminals and supplying said derived voltage between said cathodes and control electrodes of said first and second electric valves comprising a second voltage divider connected in parallel with a portion of the armature circuit of said motor, a connection from an intermediate point on said second divider to said sliding contact and connections from points on said second divider to said armature terminals, and means for supplying between the control electrode and cathode of said second valve a control voltage equal in magnitude and opposite in phase to the voltage of said alternating voltage supply conductors comprising a transformer having a primary supplied from said alternating voltage supply conductors and a secondary winding included in the connections between said cathode and control electrode of said second valve.

7. A motor control system comprising in combination, a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, a source of variable control voltage and connections from said source to said cathodes and control electrodes for supplying voltages between said cathodes and control electrodes for selectively increasing the conductivity of said valves to effect rotation of said motor in a selected direction, means for deriving a voltage from said armature terminals and supplying said derived voltage between said cathodes and control electrodes comprising a voltage divider connected across a portion of the armature circuit of said motor, a connection from a point on said divider to a point on said control voltage source, and connections from points on said divider to said armature terminals, and means for supplying between the cathode and control electrode of said second valve a voltage equal in magnitude and opposite in phase to the voltage of said alternating voltage supply conductors.

8. A motor control system comprising in combination, a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, a source of variable control voltage and connections from said source to said cathodes and control electrodes for supplying voltages between said cathodes and control electrodes for selectively increasing the conductivity of said valves to effect rotation of said motor in a selected direction, means for deriving a voltage from said armature terminals and supplying said derived voltage between said cathodes and control electrodes comprising a voltage divider connected across said armature terminals and a connection from an intermediate point on said divider to a point on said control voltage source, and means for supplying between the cathode and control electrode of said second valve a voltage equal in magnitude and opposite in phase to the voltage of said alternating voltage supply conductors.

9. A motor control system comprising in combination a pair of alternating voltage supply conductors, an electric motor having a first armature terminal connected to a first of said supply conductors, a first electric valve having an anode connected to the second of said supply conductors, a cathode connected to the second terminal of said armature and a control electrode, a second electric valve reversely connected in parallel with said first valve and provided with an anode, a cathode and a control electrode, means for supplying oppositely varying control voltages between the cathodes and control electrodes of said valves for selectively increasing conductivity of said valves to effect rotation of said motor in a selected direction comprising a pair of direct voltage supply conductors, a pair of cathode coupled amplifier valves each having an anode, a cathode and a control electrode, a common resistor of substantial ohmic value connected between said coupled cathode and one of said direct voltage supply conductors and separate resistors of substantial ohmic value connected between the anodes of said amplifier valves and the other direct voltage supply conductor, means for supplying a variable signal voltage to the control electrode of one of said amplifier valves, separate electrical connections from the anodes of said amplifier valves to the control electrodes of said first and second valves, a first voltage divider comprising a plurality of resistors connected in series relationship across said direct voltage supply conductors, one of said resistors having a sliding contact, means for deriving a voltage from said armature terminal and supplying said derived voltage between said cathodes and control electrodes of said first and second valves comprising a second voltage divider connected across the armature terminals of said motor, a connection from an intermediate point on said second divider to said sliding contact, and means for supplying a voltage between the control electrode and cathode of said second valve equal in magnitude and opposite in phase to the voltage of said alternating voltage supply conductors comprising a transformer having its primary winding supplied from said alternating voltage supply conductors and a secondary winding connected in circuit between said cathode and said control electrode of said second valve.

LEROY U. C. KELLING.

References Cited in the file of this patent

FOREIGN PATENTS

| Number | Country | Date |
| --- | --- | --- |
| 616,494 | Great Britain | Jan. 21, 1949 |